(12) United States Patent
Choi et al.

(10) Patent No.: US 12,281,606 B1
(45) Date of Patent: Apr. 22, 2025

(54) COLD START CATALYST BYPASS SYSTEM

(71) Applicant: FCA US LLC, Auburn Hills, MI (US)

(72) Inventors: Jeongyong Choi, Auburn Hills, MI (US); Michael A Barkey, Auburn Hills, MI (US); William P Attard, Auburn Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 18/820,571

(22) Filed: Aug. 30, 2024

(51) Int. Cl.
| | | |
|---|---|---|
| *F01N 3/20* | (2006.01) | |
| *B60W 10/10* | (2012.01) | |
| *F01L 1/34* | (2006.01) | |
| *F02D 23/02* | (2006.01) | |
| *F02D 29/02* | (2006.01) | |
| *F02D 43/04* | (2006.01) | |
| *F02P 5/15* | (2006.01) | |

(52) U.S. Cl.
CPC .......... *F01N 3/2053* (2013.01); *B60W 10/10* (2013.01); *F01L 1/34* (2013.01); *F02D 23/02* (2013.01); *F02D 29/02* (2013.01); *F02D 43/04* (2013.01); *F02P 5/15* (2013.01)

(58) Field of Classification Search
CPC .......... B60W 10/10; F01L 1/34; F02D 23/02; F02D 29/02; F02D 43/04; F02D 41/0002; F02D 41/0007; F02D 9/08; F02D 9/00; F02D 9/02; F02P 5/15; F01N 3/2053; F01N 3/2006; F01N 3/0878; F01N 3/101; F01N 9/00; F01N 13/009; F01N 13/011; F01N 2410/00; F02B 37/18; F02B 37/183; F02B 37/22; F02B 37/162; F02B 37/16; F02B 37/12; Y02A 50/20; Y02T 10/12; Y02T 10/40

See application file for complete search history.

(56) References Cited

U.S. PATENT DOCUMENTS

| | | | | |
|---|---|---|---|---|
| 5,791,146 | A * | 8/1998 | Dungner | F02M 26/43 60/605.2 |
| 6,324,893 | B1 * | 12/2001 | Watanabe | F01N 3/101 73/23.32 |
| 8,495,876 | B2 * | 7/2013 | Pagot | F02B 37/013 60/299 |
| 8,528,327 | B2 | 9/2013 | Bucknell et al. | |
| 9,903,268 | B2 * | 2/2018 | Smiljanovski | F02B 37/24 |

(Continued)

*Primary Examiner* — Dapinder Singh
(74) *Attorney, Agent, or Firm* — Jeremy J. Klobucar (57) ABSTRACT

An engine system includes an engine including intake and exhaust camshafts, a transmission, a turbocharger including a compressor and a turbine, a surge valve to selectively bypass the compressor, a main exhaust aftertreatment system with a main catalytic converter, and a light-off catalyst bypass system with a bypass valve configured to selectively provide exhaust gas to a bypass passage and a bypass catalytic converter. An emissions control system includes a controller configured to monitor a temperature of the main catalytic converter to determine if the temperature is below a light-off temperature, move the bypass valve to an open position to provide exhaust gas flow through the bypass passage and bypass catalytic converter when the main catalytic converter is below the predetermined light-off temperature, and move the surge valve to an open position to enable intake air to bypass the compressor to minimize pressure loss during a cold catalyst mode.

20 Claims, 4 Drawing Sheets

(56) References Cited

U.S. PATENT DOCUMENTS

| | | | |
|---|---|---|---|
| 10,138,822 B2* | 11/2018 | Ulrey | F02D 13/0261 |
| 12,012,882 B1 | 6/2024 | Wante et al. | |
| 2011/0243721 A1 | 10/2011 | Alajbegovic et al. | |
| 2014/0041380 A1* | 2/2014 | Byrd | F02B 37/16 |
| | | | 60/273 |
| 2016/0047298 A1* | 2/2016 | Löfgren | F01N 11/002 |
| | | | 60/273 |
| 2017/0089278 A1* | 3/2017 | Tulapurkar | F02D 35/027 |
| 2019/0242296 A1 | 8/2019 | Zhang et al. | |
| 2022/0235725 A1 | 7/2022 | Brand et al. | |
| 2023/0374926 A1 | 11/2023 | Brand et al. | |

* cited by examiner

COLD START CATALYST BYPASS SYSTEM

FIELD

The present application relates generally to vehicle engine exhaust treatment systems and, more particularly, to an internal combustion engine having a light-off catalyst bypass system.

BACKGROUND

In conventional internal combustion engine exhaust aftertreatment systems it is difficult to achieve low tailpipe emissions in the time immediately following a cold engine start due to low catalyst conversion efficiency of cold catalysts and poor combustion and cold engine conditions. In order to achieve acceptable conversion efficiency, the catalyst must surpass a predetermined light-off temperature. In some systems, faster light-off temperatures may be achieved, but often at the cost of high exhaust system backpressure, durability, longevity, cost, and/or complexity. Thus, while such conventional systems do work for their intended purpose, it is desirable to provide continuous improvement in the relevant art.

SUMMARY

In accordance with one example aspect of the invention, an internal combustion engine system is provided. In one example implementation, the engine system includes an internal combustion engine including an intake camshaft and an exhaust camshaft, a transmission, a turbocharger including a compressor and a turbine, a surge valve to allow intake air to selectively bypass the compressor, a main exhaust aftertreatment system with a main catalytic converter configured to receive exhaust gas from the internal combustion engine, and a light-off catalyst bypass system with a bypass valve configured to selectively provide exhaust gas to a bypass passage and a bypass catalytic converter. An emissions control system includes a controller configured to operate in a cold catalyst mode, including monitoring a temperature of the main catalytic converter to determine if the temperature is below a predetermined light-off temperature, moving the bypass valve to an open position to provide exhaust gas flow through the bypass passage and bypass catalytic converter when the main catalytic converter is below the predetermined light-off temperature, and moving the surge valve to an open position to enable intake air to bypass the compressor to minimize pressure loss during the cold catalyst mode.

In addition to the foregoing, the described engine system may include one or more of the following features: wherein the controller is further configured to receive an engine power request from a driver, calculate an intake manifold pressure target to meet the engine power request, and determine if the calculated intake manifold pressure target exceeds a predetermined threshold below a predetermined maximum pressure limit; wherein if the calculated intake manifold pressure target exceeds the predetermined threshold, the controller is further configured to reduce an amount of reserved engine torque by adjusting a spark timing closer to maximum brake torque (MBT), and control a timing of the intake and exhaust camshafts to provide increased volumetric efficiency to increase maximum air flow in the engine.

In addition to the foregoing, the described engine system may include one or more of the following features: wherein if the calculated intake manifold pressure target exceeds the predetermined threshold, the controller is further configured to command the transmission to operate in a lower gear with a higher speed to produce increased power while maintaining torque; wherein if the calculated intake manifold pressure target exceeds the predetermined threshold, the controller is further configured to close the surge valve and close the bypass valve.

In addition to the foregoing, the described engine system may include one or more of the following features: wherein the controller is further configured to receive an engine power request from a driver, calculate an intake manifold pressure target to meet the engine power request, and determine if the calculated intake manifold pressure target exceeds a first predetermined threshold below a predetermined maximum pressure limit; wherein if the calculated intake manifold pressure target exceeds the first predetermined threshold, the controller is further configured to reduce an amount of reserved engine torque by adjusting a spark timing closer to maximum brake torque (MBT), and control a timing of the intake and exhaust camshafts to provide increased volumetric efficiency to increase maximum air flow in the engine.

In addition to the foregoing, the described engine system may include one or more of the following features: wherein if the calculated intake manifold pressure target exceeds a lower second predetermined threshold below the predetermined maximum pressure limit, the controller is further configured to command the transmission to operate in a lower gear with a higher speed to produce increased power while maintaining torque; wherein if the calculated intake manifold pressure target exceeds an even lower third predetermined threshold at or below the predetermined maximum pressure limit, the controller is further configured to close the surge valve and close the bypass valve; and wherein the first predetermined threshold is approximately 20 kPa below the predetermined maximum pressure limit, wherein the second predetermined threshold is approximately 10 kPa below the predetermined maximum pressure limit, and wherein the third predetermined threshold is equal to the predetermined maximum pressure limit.

In accordance with another example aspect of the invention, a method of operating an internal combustion engine system is provided. In one example implementation, the engine system includes an internal combustion engine including an intake camshaft and an exhaust camshaft, a transmission, a turbocharger including a compressor and a turbine, a surge valve to allow intake air to selectively bypass the compressor, a main exhaust aftertreatment system with a main catalytic converter configured to receive exhaust gas from the internal combustion engine, a light-off catalyst bypass system with a bypass valve configured to selectively provide exhaust gas to a bypass passage and a bypass catalytic converter, and an emissions control system including a controller configured to operate in a cold catalyst mode.

In one example, the method includes monitoring, by the controller, a temperature of the main catalytic converter to determine if the temperature is below a predetermined light-off temperature; moving, by the controller, the bypass valve to an open position to provide exhaust gas flow through the bypass passage and bypass catalytic converter when the main catalytic converter is below the predetermined light-off temperature; and moving, by the controller, the surge valve to an open position to enable intake air to bypass the compressor to minimize pressure loss during the cold catalyst mode.

In addition to the foregoing, the described method may include one or more of the following features: receiving, by the controller, an engine power request from a driver; calculating, by the controller, an intake manifold pressure target to meet the engine power request; and determining, by the controller, if the calculated intake manifold pressure target exceeds a predetermined threshold below a predetermined maximum pressure limit. If the calculated intake manifold pressure target exceeds the predetermined threshold, the method further includes reducing, by the controller, an amount of reserved engine torque by adjusting a spark timing closer to maximum brake torque (MBT); and controlling, by the controller, a timing of the intake and exhaust camshafts to provide increased volumetric efficiency to increase maximum air flow in the engine.

In addition to the foregoing, the described method may include one or more of the following features: wherein if the calculated intake manifold pressure target exceeds the predetermined threshold, the method further includes commanding, by the controller, the transmission to operate in a lower gear with a higher speed to produce increased power while maintaining torque; wherein if the calculated intake manifold pressure target exceeds the predetermined threshold, the method further includes closing, by the controller, the surge valve; and closing, by the controller, the bypass valve.

In addition to the foregoing, the described method may include one or more of the following features: receiving, by the controller, an engine power request from a driver; calculating, by the controller, an intake manifold pressure target to meet the engine power request; and determining, by the controller, if the calculated intake manifold pressure target exceeds a first predetermined threshold below a predetermined maximum pressure limit. If the calculated intake manifold pressure target exceeds the first predetermined threshold, the method further includes reducing, by the controller, an amount of reserved engine torque by adjusting a spark timing closer to maximum brake torque (MBT); and controlling, by the controller, a timing of the intake and exhaust camshafts to provide increased volumetric efficiency to increase maximum air flow in the engine. If the calculated intake manifold pressure target exceeds a lower second predetermined threshold below the predetermined maximum pressure limit, the method further includes commanding, by the controller, the transmission to operate in a lower gear with a higher speed to produce increased power while maintaining torque.

In addition to the foregoing, the described method may include one or more of the following features: wherein if the calculated intake manifold pressure target exceeds an even lower third predetermined threshold below the predetermined maximum pressure limit, the method further includes closing, by the controller, the surge valve; and closing, by the controller, the bypass valve; and wherein the first predetermined threshold is approximately 20 kPa below the predetermined maximum pressure limit, wherein the second predetermined threshold is approximately 10 kPa below the predetermined maximum pressure limit, and wherein the third predetermined threshold is equal to the predetermined maximum pressure limit.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DESCRIPTION

Some conventional aftertreatment systems have limited or no capacity to get the catalyst to a light-off temperature for efficient conversion of harmful exhaust constituents before approximately fifteen seconds post cold start in a turbocharged system. Every second the engine is running and the catalyst is not at or above light-off temperature, exhaust gas constituents such as CO, $CO_2$, $O_2$, HC, NMHC and NOx are not being converted efficiently. The short time preceding the catalyst light-off is responsible for a very large portion of the CO, HC, and NOx breakthrough for on and off cycle starts and long idles. In conventional systems, one or more catalysts are traditionally located some distance downstream of the exhaust outlet and/or turbocharger outlet and are typically in the main exhaust flow for the entire useful life of the vehicle.

As the distance, wetted surface area, and thermal mass located between the exhaust ports and catalyst face increases, it becomes increasingly difficult to have the catalyst light-off in a timely manner. Common hardware designs to decrease time to light-off include decreasing distance to the catalyst. However, this often comes at the expense of the life of the catalyst because of higher temperature, gas velocities, and thermal gradients. Further, as a catalyst is subjected to exhaust flow, high temperatures, and/or unwanted chemicals, it slowly loses capacity for efficient conversion (catalyst aging). Conventional systems typically account for this catalyst aging by increasing precious metal loading, catalyst volume, and catalyst surface area, which can potentially be a resource burden and increase cost and complexity of the systems.

Accordingly, described herein are systems and methods for a catalyst bypass system for improving tailpipe emissions during operation of an internal combustion engine. The system utilizes a light-off catalyst bypass system with an additional integrated catalyst. During system operation, the exhaust gas is routed directly to one or more bypass catalysts before it re-enters the main exhaust path. This will allow for rapid catalyst light-off of the bypass catalyst and improved conversion of harmful exhaust constituents.

In the example embodiments, the light-off catalyst bypass system includes a bypass valve and an auxiliary bypass catalyst. The bypass valve is configured to be used in combination with a bypass flow passage having the bypass catalyst. An inlet to the bypass catalyst system is located before a turbine inlet or at/near the exhaust manifold collector. In some examples, the inlet is located as close as possible to the exhaust ports or cylinder head to minimize heat losses from the exhaust gas. As such, the close proximity of the bypass catalyst to the exhaust gas in the cylinder head enables rapid heating to hasten the conversion rate of harmful exhaust constituents.

Due to its small size and low surface area/distance between it and the exhaust valves, the bypass catalyst warms up much quicker than the conventional catalyst. During a cold engine start up event or other situation where it is desirable to have the exhaust gas flow through the catalyst bypass system, the bypass valve is actuated to restrict flow to the turbine and route the exhaust gas through the light-off catalyst bypass system. Restricting flow from going directly to the turbine and to the conventional catalyst during cold start is desirable because the conventional catalyst cannot effectively convert exhaust constituents before it reaches a minimum or catalyst "light-off" temperature. The gas exiting the bypass catalyst is then directed to the main catalyst to assist it in achieving a quicker light-off.

In the example embodiment, the system has two main positions, a bypass position and a default position. The bypass position is enabled when the bypass valve restricts main exhaust flow through the turbine and the exhaust gases are routed through the bypass catalyst system. The default position is enabled when the bypass valve allows main exhaust flow through the turbine. Once the main catalyst light-off is achieved, the valve can begin actuating to the default position.

Advantages of the system include: extremely fast catalyst light-off times, the ability to selectively drive most or all of the exhaust flow through a bypass catalyst before going through the main exhaust path; extremely short distance, surface area, and thermal mass between the exhaust ports and the bypass catalyst via bypassing the turbocharger turbine; the ability to deactivate the bypass catalyst after light-off; extremely high cell density substrate in the catalyst that would not be used in a non-bypassable system due to excessive backpressure; and the ability to move PGM (platinum group metals) away from the main catalyst and onto the bypass catalyst for better PGM utilization.

After rapid light-off, the catalyst begins effectively converting exhaust constituents via exothermic reactions and producing more exhaust heat, which assists in heating up the main catalyst. Once the main catalyst reaches light-off temperature, the bypass valve can be closed to block off the bypass catalyst and the conventional exhaust flow can continue. Selective deactivation of the bypass catalyst system provides benefits for both the bypass and main catalyst.

In one example, the bypass catalyst can have high precious metal loading with high cell density substrate so that it has very high conversion efficiency at cold start. Such a high cell density substrate could potentially cause significant exhaust backpressure in a conventional system, as well as speed aging due to continuous exposure to high exhaust temperatures and flows. Neither backpressure nor aging are concerns in the current system since the auxiliary bypass catalyst can be bypassed outside of cold start conditions. Similarly, the main catalyst can use fewer precious metals since it is not relied upon for cold start emissions. Precious metal loading of the main (and much larger) catalyst can make up a significant cost of the emissions system and is also responsible for aging or performance degradation of the emissions system during its full useful life. As such, the system allows for increased emission system efficacy with decreased degradation due to aging.

However, as previously discussed, operating in the cold start bypass mode restricts main exhaust flow through the turbine and the exhaust gases are routed through the bypass catalyst system, which limits engine torque and power. In some situations, if a driver requests a high torque, the bypass system will be disabled or "kicked out" (e.g., bypass valve closed) to allow exhaust flow through the turbine to deliver the requested torque. However, if the engine system is kicked out of the light-off operation too early, tailpipe emissions may be increased if the main catalyst temperature is lower than the light-off temperature.

Accordingly, the system described herein is further configured to alter engine operation to provide the driver requested torque while remaining in the bypass catalyst light-off mode, also referred to as the cold light-off catalyst (CLOC) mode. To achieve this, when the CLOC mode is enabled, a compressor surge valve is opened to minimize pressure loss through the compressor, which is not operating due to the turbine being bypassed. When the intake manifold pressure target reaches a first threshold (e.g., 20 kPa) below (or away from) a calibratable maximum pressure limit, the engine system is controlled to reduce the amount of reserved torque by moving the spark closer to maximum brake torque (MBT) (e.g., optimized spark). The engine system is also controlled such that the intake and exhaust camshafts are moved to a position to achieve higher volumetric efficiency to increase maximum CLOC mode air flow. When the intake manifold pressure target reaches a lower second threshold (e.g., 10 kPa) below (or away from) the maximum pressure limit, the transmission is controlled to achieve a lower gear and higher speed to produce higher power while maintaining torque. If the intake manifold pressure target reaches an even lower third threshold (e.g., 0 kPa), the bypass valve and surge valves are closed and the CLOC mode is disabled.

Figure 1:
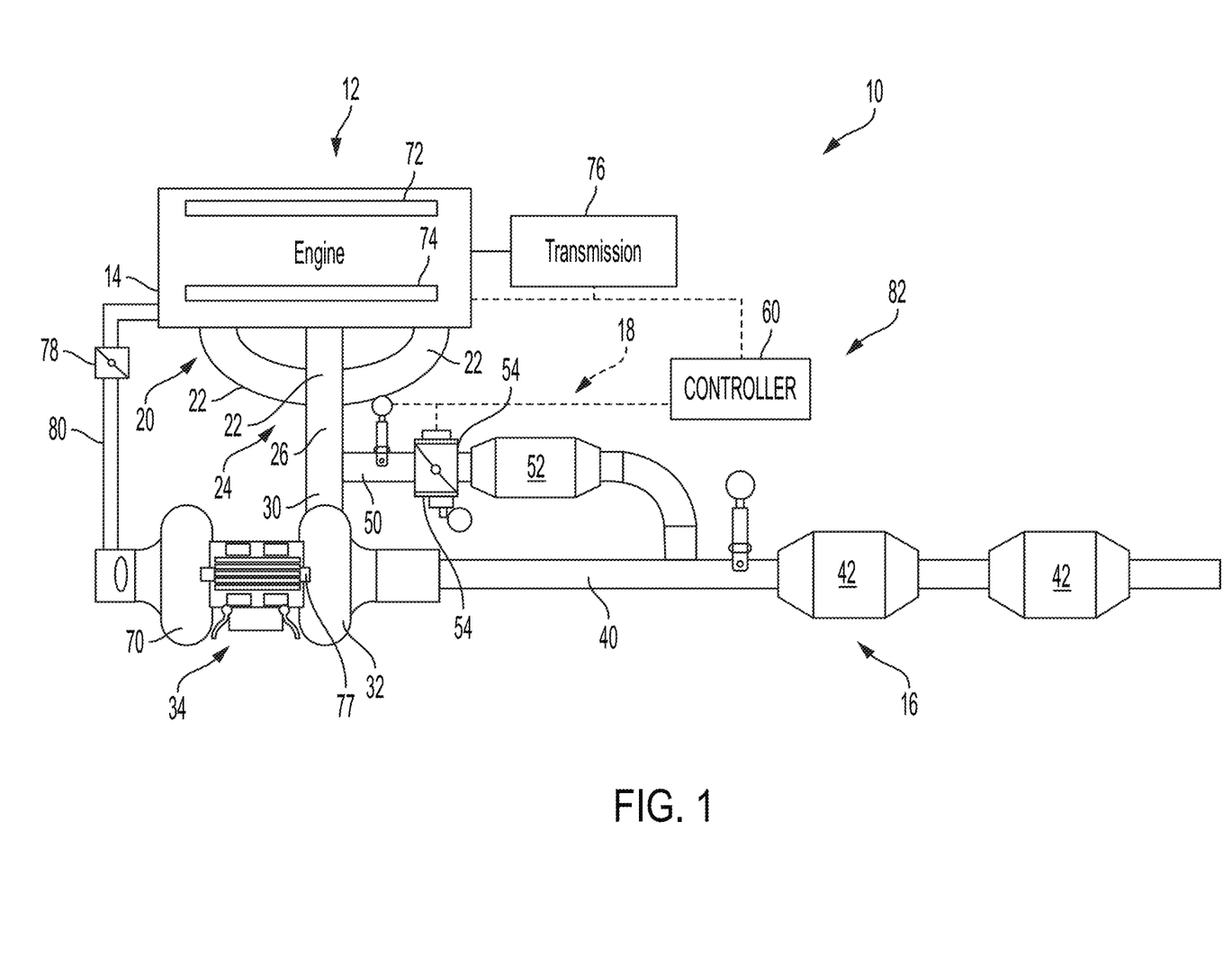
FIG. 1 is a schematic illustration of an example internal combustion engine system with a light-off catalyst bypass system, in accordance with the principles of the present application.

With initial reference to FIG. 1, an internal combustion engine system 10 having an internal combustion engine 12 with a cylinder head 14 is illustrated in accordance with the principles of the present application. In the example embodiment, the cylinder head 14 is configured to selectively supply exhaust gas to a main exhaust aftertreatment system 16 and a light-off catalyst bypass system 18. As described herein in more detail, the light-off catalyst bypass system 18 is selectively utilized during cold start, long idle, and/or cold catalyst conditions to rapidly heat to light-off temperatures to quickly achieve low tailpipe emissions. When a driver torque request is received, the system takes mitigation steps to ensure the bypass system 18 remains operational while meeting the torque request demand.

As shown in FIG. 1, the engine system 10 further includes an exhaust manifold 20 having a plurality of cylinder exhaust passages 22 that merge together to form a collector portion or main exhaust passage 24 having an outlet 26. In some embodiments, the exhaust manifold 20 may be coupled (e.g., bolted) to the cylinder head 14 or alternatively integrated therein. A main outlet duct 30 receives exhaust gas from the manifold outlet 26 and is configured to direct the exhaust gas to the main exhaust aftertreatment system 16. In the illustrated example, the main outlet duct 30 configured to provide exhaust gas to a charger device, such as a turbine 32 of a turbocharger 34. It will be appreciated that the charger device may be a supercharger rather than a turbocharger, or engine 12 may not include a charger device such that main outlet duct 30 is directly connected to the main exhaust aftertreatment system 16.

In the example embodiment, the main exhaust aftertreatment system 16 generally includes a main exhaust conduit 40 having one or more main catalytic converters 42 to reduce or convert a desired exhaust gas constituent such as, for example, carbon monoxide (CO), hydrocarbon (HC), and/or nitrogen oxides (NOx). The main exhaust conduit 40 is fluidly coupled to the exhaust manifold main outlet 26 (optionally via the turbocharger turbine 32) and is configured to receive exhaust gas from the vehicle engine 12 and supply the exhaust gas to the main catalytic converter 42. In order to efficiently reduce or convert CO, HC, and NOx, the main catalytic converter 42 must reach a predetermined light-off temperature. However, during some vehicle operations such as cold starts, the main catalytic converter 42 is below light-off temperature and therefore has a low catalyst conversion efficiency.

In order to efficiently reduce or convert the unwanted exhaust gas constituents while the main catalytic converter 42 is below the light-off temperature, the vehicle utilizes the light-off catalyst bypass system 18, which generally includes a bypass passage 50, a bypass catalytic converter ("bypass catalyst") 52, and a bypass valve 54. The light-off catalyst bypass system 18 is configured to redirect at least a portion of the exhaust gas from the exhaust manifold 20, into the bypass passage 50, and through the auxiliary bypass catalyst 52. Because the bypass catalyst 52 is located close to the cylinder head 14, it is in close proximity to the engine combustion chambers and receives the exhaust gas quicker and at a higher temperature than the main catalytic converter 42 would. Thus, the bypass catalyst 52 is rapidly heated to its predetermined light-off temperature to achieve high catalyst conversion efficiency before the main catalytic converter 42 alone. It will be appreciated that the light-off catalyst bypass system 18 may have various configurations and be integrated with or into the cylinder head 14 in various manners.

A controller 60 (e.g., engine control unit) is in signal communication with the bypass valve 54 and is configured to move the bypass valve 54 to any position between a fully open first position and a fully closed second position. For example, in an open first position, the bypass valve 54 enables exhaust gas to flow through the bypass passage 50 and thus the bypass catalyst 52. In some configurations, the bypass valve 54 in the open first position also prevents exhaust gas from flowing through the main outlet duct 30 and turbine 32. In a closed second position, the bypass valve 54 prevents exhaust gas from flowing through the bypass passage 50 and bypass catalyst 52. Although illustrated in the example implementation as a butterfly valve, it will be appreciated that bypass valve 54 may be any suitable valve that enables light-off catalyst bypass system 18 to operate as described herein. Moreover, while bypass valve 54 is shown as located within bypass passage 50, it will be appreciated that bypass valve 54 may be disposed in any suitable location, such as between outlet 26 and main outlet duct 30.

In one example, the bypass catalyst 52 is a three-way catalyst configured to remove CO, HC, and NOx from the exhaust gas passing therethrough, as described herein in more detail. However, it will be appreciated that bypass catalyst 52 may be any suitable catalyst that enables light-off catalyst bypass system 18 to remove any desired pollutant or compound such as, for example, a hydrocarbon trap or a four-way catalyst. In another example, bypass catalyst 52 has a cell density of between approximately 800 and approximately 1200 cells per square inch, or between 800 and 1200 cells per square inch.

With continued reference to FIG. 1, the engine system 10 also includes a compressor 70, an intake camshaft 72, an exhaust camshaft 74, and a transmission 76. The compressor 70 is part of the turbocharger 34 and is coupled for rotation with the turbine 32 via a shaft 77. In normal operation, intake air passes through compressor 70 and is supplied to the engine intake via an intake passage (not shown). The compressor 70 also includes a surge valve 78 configured to selectively allow intake air to bypass the compressor 70 via a surge passage 80 to control intake air pressure. The intake camshaft 72 is configured to control a timing of the opening and closing of engine intake valves (not shown), and the exhaust camshaft 74 is configured to control a timing of the opening and closing of engine exhaust valves (not shown). The transmission 76 is configured to transfer rotational output from the engine 12 through a gear set and then onto the vehicle drivetrain (not shown). In the example embodiment, the controller 60 is in signal communication with the bypass valve 54, the surge valve 78, the intake/exhaust cams 72, 74, and the transmission 76 for control thereof during the cold catalyst mode, as described herein in more detail.

In one example, the light-off catalyst bypass system 18 further includes an emissions control system 82 configured to monitor operation of the light-off catalyst bypass system 18. In the example embodiment, the emissions control system 82 includes engine controller 60, which is configured to maintain a desired air-to-fuel ratio, as well as control other tasks such as spark timing, intake/exhaust cam timing, exhaust gas recirculation, onboard diagnostics, and the like. The emissions control system 82 may also include various sensors, transducers, or the like that are in communication with the controller 60 through inputs and outputs to further carry out the operations described herein.

In the example embodiment, the light-off catalyst bypass system 18 is configured to selectively operate in (i) a normal or warm catalyst mode and (ii) a cold catalyst mode (CLOC mode). In the warm catalyst mode, controller 60 determines the main catalytic converter 42 has reached the predetermined light-off temperature (e.g., via temperature sensor, modeled, etc.) and moves the bypass valve 54 to the fully closed position. In this mode, the bypass valve 54 facilitates preventing the exhaust gas in the exhaust manifold 20 from entering the bypass passage 50 and thus bypass catalyst 52. Instead, the exhaust gas is directed through main exhaust passage 24, the turbocharger turbine 32 (if present), into the main exhaust conduit 40, and through the main catalytic converter 42 before being exhausted to the atmosphere.

In the cold catalyst mode, controller 60 determines the main catalytic converter 42 is below the predetermined light-off temperature (e.g., a cold start), and subsequently moves the bypass valve 54 to the fully open position. In this mode, the bypass valve 54 enables the exhaust gas to be directed through bypass passage 50 and bypass catalyst 52 before being directed to the main exhaust conduit 40 and atmosphere. In some implementations, the turbine 32 may be operated in a reverse rotation to facilitate preventing the exhaust gas in the exhaust manifold 20 from going through the turbine 32 to the main exhaust conduit 40. Once the main catalytic converter 42 has reached the light-off temperature, the controller 60 may then switch the light-off catalyst bypass system 18 to the normal mode.

Figure 2:
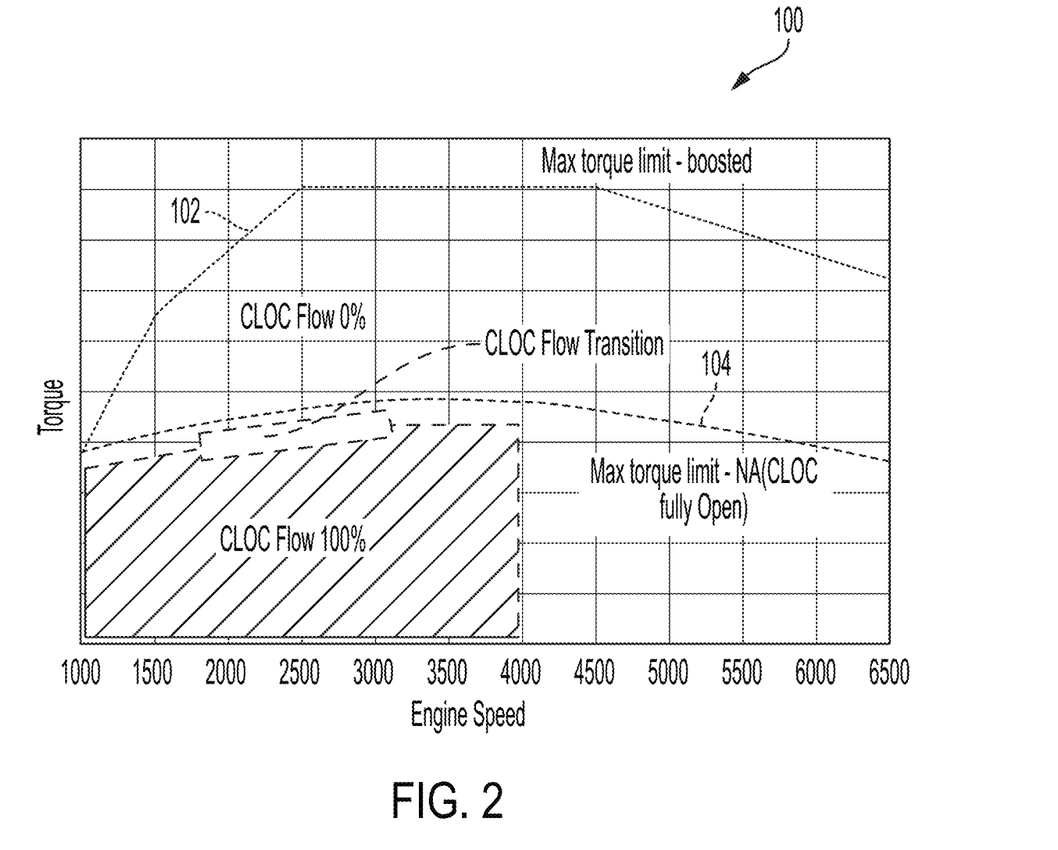
FIG. 2 is a graph illustrating an example operation of the engine system with and without the light-off catalyst bypass system, in accordance with the principles of the present application.
Figure 3:
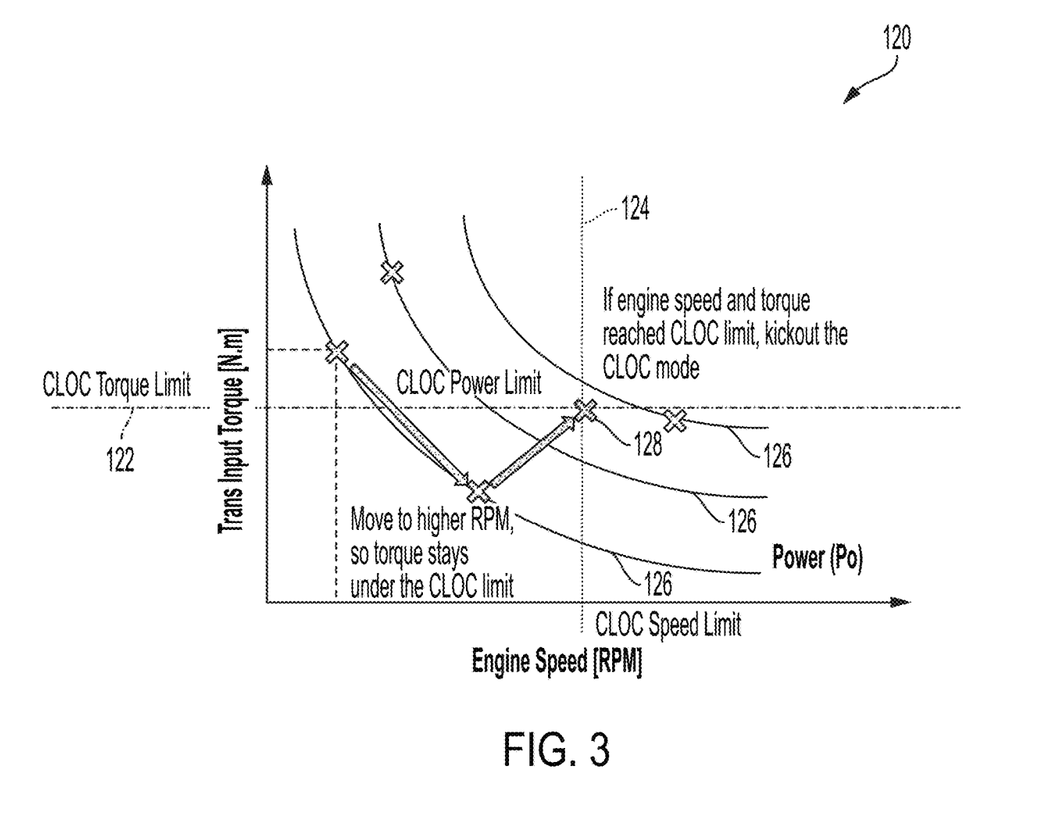
FIG. 3 is a graph illustrating engine power in an example operation of the light-off catalyst bypass system, in accordance with the principles of the present application.

With reference now to FIGS. 2 and 3, as previously described, during the cold catalyst mode, the driver may provide a torque request (e.g., via an accelerator pedal) that exceeds the capability of the engine system 10 while the turbine 32 is bypassed, thereby causing the engine system 10 to prematurely exit the cold catalyst mode to meet the driver demand. For example, FIG. 2 illustrates a graph 100 showing a maximum torque limit 102 of the engine system when utilizing the turbocharger 34, and a maximum torque limit 104 when operating in the cold catalyst mode when the turbocharger 34 is bypassed. FIG. 3 illustrates a graph 120 showing a torque limit 122, an engine speed limit 124, engine power profiles 126, and an engine power limit 128 when operating in the cold catalyst mode. In some cold catalyst mode operations, if the driver power/torque demand exceeds max torque limit 104, 122 or engine speed limit 124, control may prematurely exit the cold catalyst mode. Accordingly, the systems and methods described herein enable the engine system 10 to meet the driver demand without exiting the cold catalyst mode.

In one example operation, controller 60 determines the main catalytic converter 42 is below the predetermined light-off temperature (e.g., a cold start), and subsequently moves the bypass valve 54 to the fully open position, and opens the surge valve 78 to minimize pressure loss. However, if the controller 60 receives a torque/power request from the driver, the controller 60 determines if the resulting intake manifold pressure target (to meet the demand) exceeds one or more predetermined thresholds.

During the cold catalyst mode, the engine is typically operated with a catalyst heating or retarded spark timing to generate more heat to rapidly warm the catalysts. However, due to the torque/power request, when the intake manifold target pressure (to meet the request) reaches a first predetermined threshold (e.g., 20 kPa) below a calibratable predetermined maximum pressure limit (e.g., throttle inlet pressure), controller 60 reduces the amount of reserved torque by adjusting the spark timing closer to optimal MBT. The controller 60 also adjusts the timing of intake/exhaust cams 72, 74 to provide a higher volumetric efficiency and maximum air flow through engine 12.

If the driver torque/power request continues to increase intake manifold target pressure, even after the previous mitigation operations, to a second predetermined threshold (e.g., 10 kPa) below the predetermined maximum pressure limit, then controller 60 commands a gear change of transmission 76 to operate with a lower gear and higher engine speed to provide higher power while maintaining torque. For example, controller 60 may shift the transmission from third gear to second gear. If the driver torque/power request continues to increase intake manifold target pressure, even after the previous mitigation operations, to a third predetermined threshold (e.g., equal to the predetermined maximum pressure limit), control closes the bypass valve 54 and surge valve 78 and disables the cold catalyst mode operation.

Figure 4:
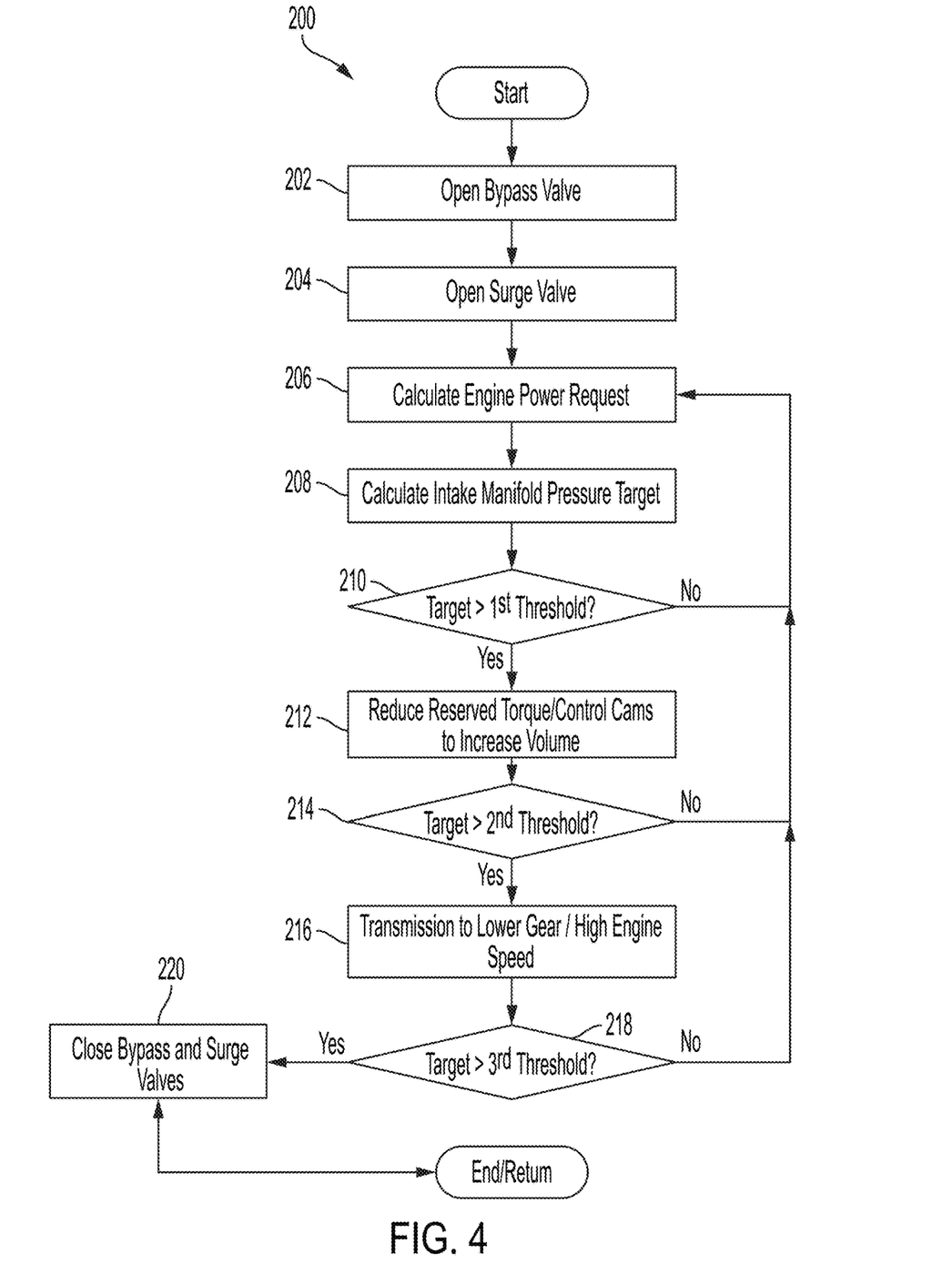
FIG. 4 is a flow control diagram of an example method of operating the engine system shown in FIG. 1, in accordance with the principles of the present application.

With reference now to FIG. 4, a flow diagram of an example method 200 of operating engine system 10 in the cold catalyst mode will be described. While the components of engine system 10 are specifically referenced for illustrative/descriptive purposes, it will be appreciated that the method 200 could be applicable to any suitable vehicle or engine system. The method begins at 202 where the controller 60 ("control") determines the main catalyst 42 is below a predetermined light-off temperature and opens the bypass valve 54 to allow exhaust to pass through the bypass passage 50. At 204, control opens the surge valve 78 to allow intake air to flow through surge passage 80 to bypass the compressor 70.

At 206, control calculates an engine power request based on a throttle request received from the driver (e.g., via accelerator pedal). At 208, control calculates an intake manifold pressure target to meet the driver throttle request. At 210, control determines if the calculated intake manifold pressure target exceeds a first pressure threshold (e.g., 20 kPa) below the predetermined maximum pressure limit. If no, control returns to step 206. If yes, at 212, control reduces reserved torque (e.g., by moving spark closer to MBT) and controls the timing of intake/exhaust cams 72, 74 to provide a higher volumetric efficiency and maximum air flow through engine 12.

At 214, control determines if the calculated intake manifold pressure target exceeds a lower second pressure threshold (e.g., 10 kPa) below the predetermined maximum pressure limit. If no, control returns to step 206. If yes, at 216, control commands a gear change of transmission 76 to operate with a lower gear and higher engine speed to meet the driver demand and provide higher power while maintaining torque. At 218, control determines if the calculated intake manifold pressure target exceeds an even lower third pressure threshold (e.g., 0 kPa) below (or equal to) the predetermined maximum pressure limit. If no, control returns to step 206. If yes, at 220, control closes the bypass valve 54 and surge valve 78, and exits the CLOC mode to provide the driver with the requested torque/power.

It will be appreciated that the term "controller" or "module" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present disclosure, its application or uses. Thus, variations that do not depart from the gist of the present disclosure are intended to be within the scope of the present disclosure.

What is claimed is:

1. An internal combustion engine system, comprising:
   an internal combustion engine including an intake camshaft and an exhaust camshaft;
   a transmission;
   a turbocharger including a compressor and a turbine;
   a surge valve to allow intake air to selectively bypass the compressor;
   a main exhaust aftertreatment system with a main catalytic converter configured to receive exhaust gas from the internal combustion engine;
   a light-off catalyst bypass system with a bypass valve configured to selectively provide exhaust gas to a bypass passage and a bypass catalytic converter; and
   an emissions control system including a controller configured to operate in a cold catalyst mode, comprising:
   monitoring, by the controller, a temperature of the main catalytic converter to determine if the temperature is below a predetermined light-off temperature;

moving, by the controller, the bypass valve to an open position to provide exhaust gas flow through the bypass passage and bypass catalytic converter when the main catalytic converter is below the predetermined light-off temperature; and moving, by the controller, the surge valve to an open position to enable intake air to bypass the compressor to minimize pressure loss during the cold catalyst mode.

2. The internal combustion engine system of claim 1, wherein the controller is further configured to:
receive an engine power request from a driver;
calculate an intake manifold pressure target to meet the engine power request; and
determine if the calculated intake manifold pressure target exceeds a predetermined threshold below a predetermined maximum pressure limit.

3. The internal combustion engine system of claim 2, wherein if the calculated intake manifold pressure target exceeds the predetermined threshold, the controller is further configured to:
reduce an amount of reserved engine torque by adjusting a spark timing closer to maximum brake torque (MBT); and
control a timing of the intake and exhaust camshafts to provide increased volumetric efficiency to increase maximum air flow in the engine.

4. The internal combustion engine system of claim 2, wherein if the calculated intake manifold pressure target exceeds the predetermined threshold, the controller is further configured to:
command the transmission to operate in a lower gear with a higher speed to produce increased power while maintaining torque.

5. The internal combustion engine system of claim 2, wherein if the calculated intake manifold pressure target exceeds the predetermined threshold, the controller is further configured to:
close the surge valve; and
close the bypass valve.

6. The internal combustion engine system of claim 1, wherein the controller is further configured to:
receive an engine power request from a driver;
calculate an intake manifold pressure target to meet the engine power request; and
determine if the calculated intake manifold pressure target exceeds a first predetermined threshold below a predetermined maximum pressure limit.

7. The internal combustion engine system of claim 6, wherein if the calculated intake manifold pressure target exceeds the first predetermined threshold, the controller is further configured to:
reduce an amount of reserved engine torque by adjusting a spark timing closer to maximum brake torque (MBT); and
control a timing of the intake and exhaust camshafts to provide increased volumetric efficiency to increase maximum air flow in the engine.

8. The internal combustion engine system of claim 7, wherein if the calculated intake manifold pressure target exceeds a lower second predetermined threshold below the predetermined maximum pressure limit, the controller is further configured to:
command the transmission to operate in a lower gear with a higher speed to produce increased power while maintaining torque.

9. The internal combustion engine system of claim 8, wherein if the calculated intake manifold pressure target exceeds an even lower third predetermined threshold at or below the predetermined maximum pressure limit, the controller is further configured to:
close the surge valve; and
close the bypass valve.

10. The internal combustion engine system of claim 9, wherein the first predetermined threshold is approximately 20 kPa below the predetermined maximum pressure limit,
wherein the second predetermined threshold is approximately 10 kPa below the predetermined maximum pressure limit, and
wherein the third predetermined threshold is equal to the predetermined maximum pressure limit.

11. A method of operating an internal combustion engine system that comprises:
an internal combustion engine including an intake camshaft and an exhaust camshaft;
a transmission;
a turbocharger including a compressor and a turbine;
a surge valve to allow intake air to selectively bypass the compressor;
a main exhaust aftertreatment system with a main catalytic converter configured to receive exhaust gas from the internal combustion engine;
a light-off catalyst bypass system with a bypass valve configured to selectively provide exhaust gas to a bypass passage and a bypass catalytic converter; and
an emissions control system including a controller configured to operate in a cold catalyst mode, the method comprising:
monitoring, by the controller, a temperature of the main catalytic converter to determine if the temperature is below a predetermined light-off temperature;
moving, by the controller, the bypass valve to an open position to provide exhaust gas flow through the bypass passage and bypass catalytic converter when the main catalytic converter is below the predetermined light-off temperature; and
moving, by the controller, the surge valve to an open position to enable intake air to bypass the compressor to minimize pressure loss during the cold catalyst mode.

12. The method of claim 11, further comprising:
receiving, by the controller, an engine power request from a driver;
calculating, by the controller, an intake manifold pressure target to meet the engine power request; and
determining, by the controller, if the calculated intake manifold pressure target exceeds a predetermined threshold below a predetermined maximum pressure limit.

13. The method of claim 12, wherein if the calculated intake manifold pressure target exceeds the predetermined threshold, the method further includes:
reducing, by the controller, an amount of reserved engine torque by adjusting a spark timing closer to maximum brake torque (MBT); and
controlling, by the controller, a timing of the intake and exhaust camshafts to provide increased volumetric efficiency to increase maximum air flow in the engine.

14. The method of claim 12, wherein if the calculated intake manifold pressure target exceeds the predetermined threshold, the method further includes:

commanding, by the controller, the transmission to operate in a lower gear with a higher speed to produce increased power while maintaining torque.

15. The method of claim 12, wherein if the calculated intake manifold pressure target exceeds the predetermined threshold, the method further includes:
    closing, by the controller, the surge valve; and
    closing, by the controller, the bypass valve.

16. The method of claim 11, further comprising:
    receiving, by the controller, an engine power request from a driver;
    calculating, by the controller, an intake manifold pressure target to meet the engine power request; and
    determining, by the controller, if the calculated intake manifold pressure target exceeds a first predetermined threshold below a predetermined maximum pressure limit.

17. The method of claim 16, wherein if the calculated intake manifold pressure target exceeds the first predetermined threshold, the method further comprises:
    reducing, by the controller, an amount of reserved engine torque by adjusting a spark timing closer to maximum brake torque (MBT); and
    controlling, by the controller, a timing of the intake and exhaust camshafts to provide increased volumetric efficiency to increase maximum air flow in the engine.

18. The method of claim 17, wherein if the calculated intake manifold pressure target exceeds a lower second predetermined threshold below the predetermined maximum pressure limit, the method further includes:
    commanding, by the controller, the transmission to operate in a lower gear with a higher speed to produce increased power while maintaining torque.

19. The method of claim 18, wherein if the calculated intake manifold pressure target exceeds an even lower third predetermined threshold below the predetermined maximum pressure limit, the method further includes:
    closing, by the controller, the surge valve; and
    closing, by the controller, the bypass valve.

20. The method of claim 19, wherein the first predetermined threshold is approximately 20 kPa below the predetermined maximum pressure limit,
    wherein the second predetermined threshold is approximately 10 kPa below the predetermined maximum pressure limit, and
    wherein the third predetermined threshold is equal to the predetermined maximum pressure limit.

* * * * *